United States Patent [19]
Hansen

[11] 3,821,560
[45] June 28, 1974

[54] LIGHTING FIXTURES FOR BOAT TRAILERS

[76] Inventor: Norman Joseph Hansen, 4055 Beechwood Ln., Mobile, Ala. 36609

[22] Filed: Feb. 5, 1973

[21] Appl. No.: 329,675

[52] U.S. Cl............................................ 307/10 LS
[51] Int. Cl............................................. H02g 3/00
[58] Field of Search ...... 307/9, 10 R, 10 BP, 10 LS; 200/161; 340/275, 52 R, 244; 280/414; 315/77

[56] References Cited
UNITED STATES PATENTS

| 2,538,581 | 1/1951  | Minch et al | 307/10 BP |
| 2,660,443 | 11/1953 | Miller      | 280/414 R |
| 2,847,136 | 8/1958  | Neff        | 280/414 R |
| 2,856,087 | 10/1958 | Steber      | 280/414 R |
| 3,090,871 | 5/1963  | Gorman      | 280/414 R |
| 3,418,628 | 12/1968 | Fenner      | 340/282 X |
| 3,497,707 | 2/1970  | Stewart     | 307/9     |
| 3,585,582 | 6/1971  | Dove        | 340/52 R  |

Primary Examiner—Robert K. Schaefer
Assistant Examiner—M. Ginsburg

[57] ABSTRACT

A toggle switch arrangement is mounted on a boat trailer frame intermediate the trailer tail lights and the towing vehicle. This allows disconnection of electric current to the trailer before a boat launching or loading operation during which the back of the trailer may become immersed in water.

4 Claims, 3 Drawing Figures

PATENTED JUN 28 1974

3,821,560

LIGHTING FIXTURES FOR BOAT TRAILERS

This invention relates to improvements in light fixture arrangements for boat trailers which include a toggle switch connecting the source of current and the tail lights of the trailer.

It is generally required that a trailer for boats be equipped with tail lights which are attached to the rear of the trailer and which serve as position and brake lights. When backing into the water to launch or load a boat, the use of the vehicle brakes while the lights are under water can cause the light bulbs and/or the fuse of the vehicle to blow. This can be a very bothersome experience, especially when it occurs in a remote area.

It is the object of the present invention to provide current disconnecting means on a boat trailer which will prevent transmission of electric current to its tail light assembly.

Other objects and features of the invention will become evident to those skilled in the art as the following description proceeds together with the accompanying drawing showing an illustrative example of the invention.

Figure 1:
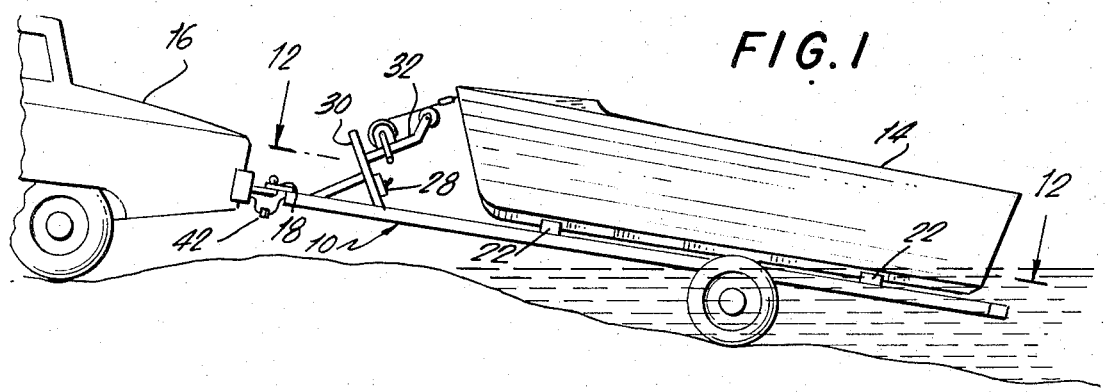
FIG. 1 is a diagrammatic side elevational view of a boat trailer showing a toggle switch housing according to the invention and mounted on the bracket supporting the boat winch.
Figure 2:
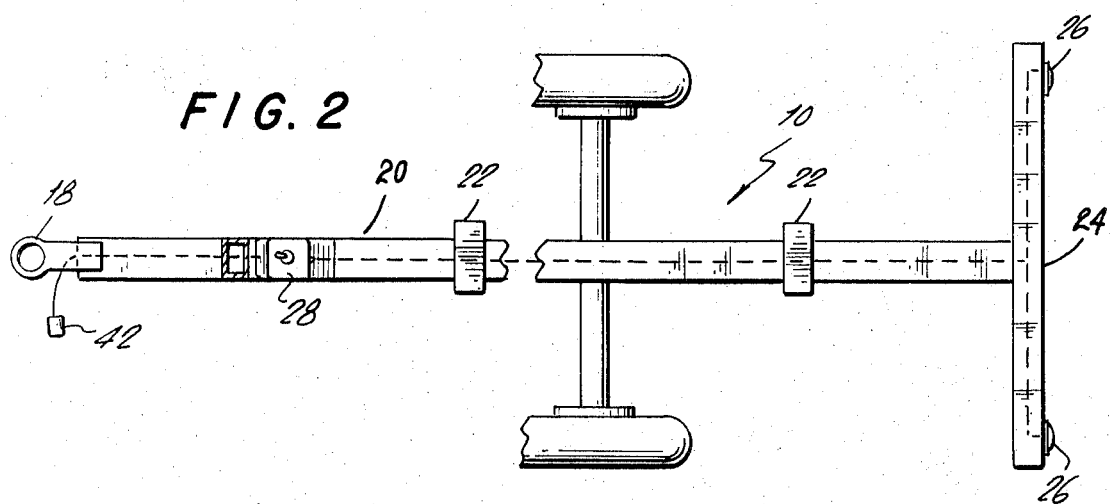
FIG. 2 is a top plan view of the assembly of FIG. 1.

Referring to the drawing, 10 designates generally a trailer adapted to be maneuvered to a position on an inclined shore of a body of water 12 to load or launch a boat 14. The trailer 10 is hitched to a towing vehicle 16 by means of a usual ball and hitch assembly 18. As shown, the trailer includes a hollow frame 20 supporting holders 22 for the boat. Secured at right angles to the back end of the trailer is a hollow fixture 24 holding a lamp 26 at each end. The fixture 24 and the frame 20 are both hollow or have a passageway therein to allow passage of the wiring.

Figure 3:
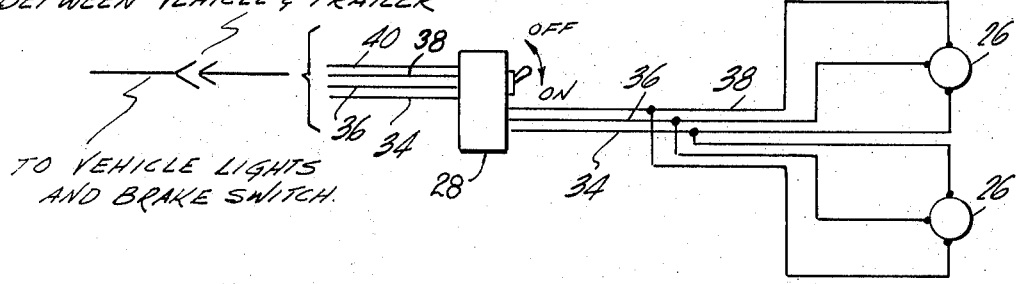
FIG. 3 is a schematic diagram of the electrical circuit for the assembly of FIG. 1.

The wiring is shown on FIG. 3. Three wires mounted in a suitable cable connect the tail light fixture to a three pole single throw toggle switch 28 which is mounted on bracket 30 supporting boat winch 32. One of the wires 34 is for the tail. The second 36 is for the twin signal and the third 38 is for the brake light. Another cable containing the wires corresponding to the three mentioned and a ground 40 is connected to a plug connector 42 which suitably fits in an outlet to the towing vehicle lights and brake switch. The toggle switch thus makes it possible to disconnect all current from the trailer.

While the invention has been described with reference to specific structural details, it will be appreciated that changes may be made therein and in the overall assembly. Such changes are fully equivalent to the invention as claimed hereinbelow.

Having regard to the foregoing, the following is claimed:

1. In a boat trailer, the assembly comprising: a light fixture mounted at one end thereof, lamps in said fixture adapted to shine as tail lights, turn signals and brake lights upon functioning of the corresponding lights of a towing vehicle; a switch mounted on said trailer and having operative and inoperative positions, wires leading from the switch and connected to the lamps, and wires leading from said switch to said corresponding lights of said vehicle whereby said light fixture may be electrically switched off when said trailer becomes immersed in water.

2. The assembly of claim 1, wherein said switch is a three pole single throw toggle switch.

3. The assembly of claim 1 wherein said switch is mounted on a support on said trailer.

4. The assembly of claim 1, wherein said trailer has a hollow frame and said fixture is also hollow to permit said wires to pass through said frame and fixture.

* * * * *